Aug. 12, 1930.  E. C. HATCHER  1,772,748
POWER TRANSMISSION GEARING FOR THE RUNNING AXLES OF VEHICLES
Filed Dec. 21, 1928   5 Sheets-Sheet 1
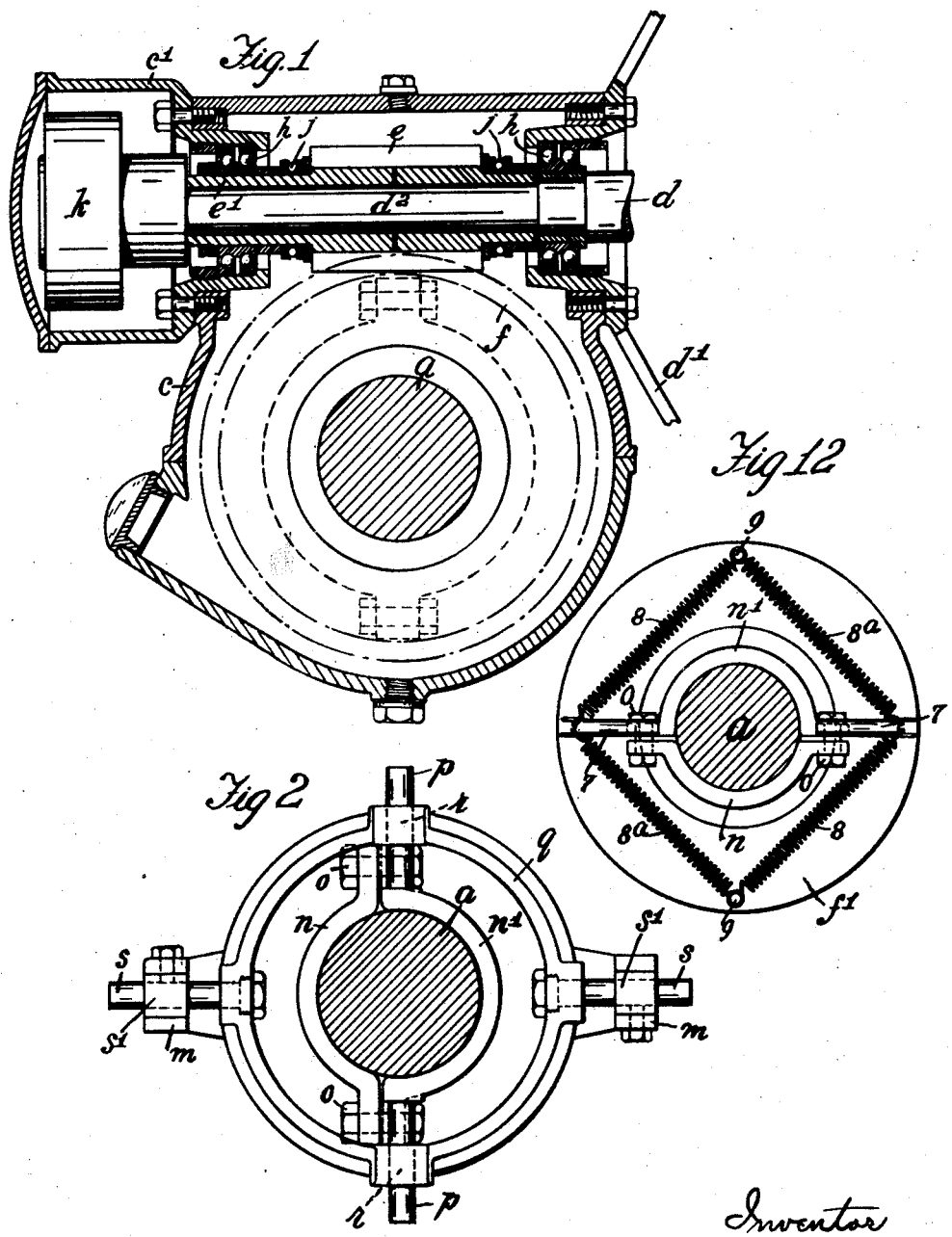

Aug. 12, 1930.  E. C. HATCHER  1,772,748
POWER TRANSMISSION GEARING FOR THE RUNNING AXLES OF VEHICLES
Filed Dec. 21, 1928  5 Sheets-Sheet 2
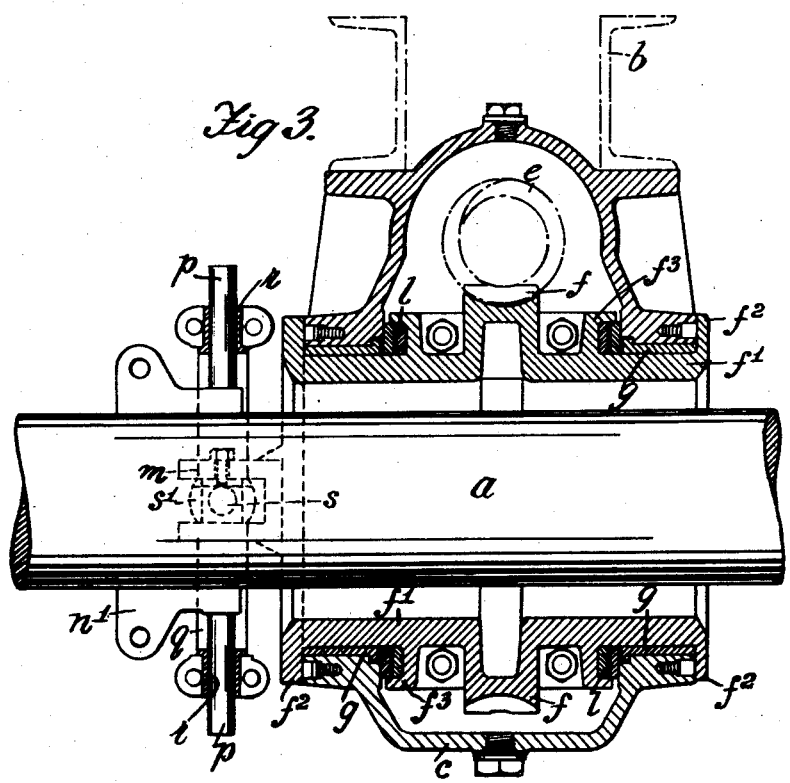
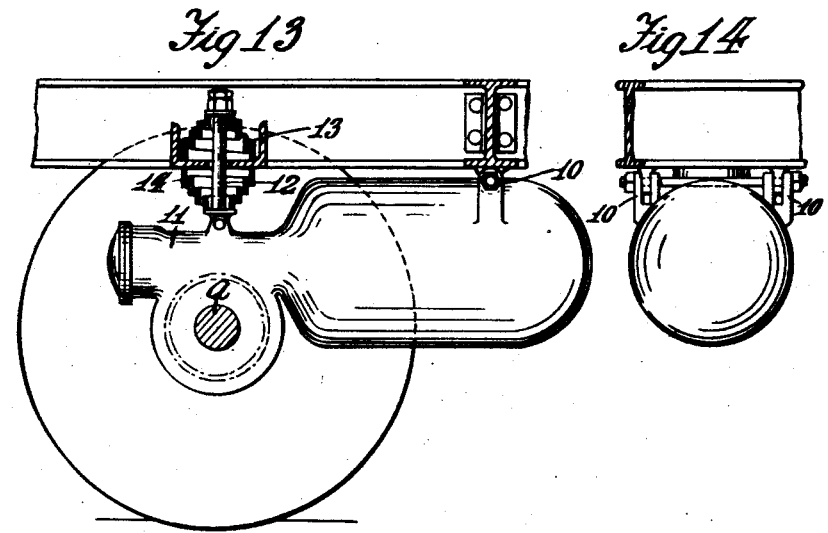
Inventor,
Ernest C. Hatcher,
By Henry Orth Jr atty.

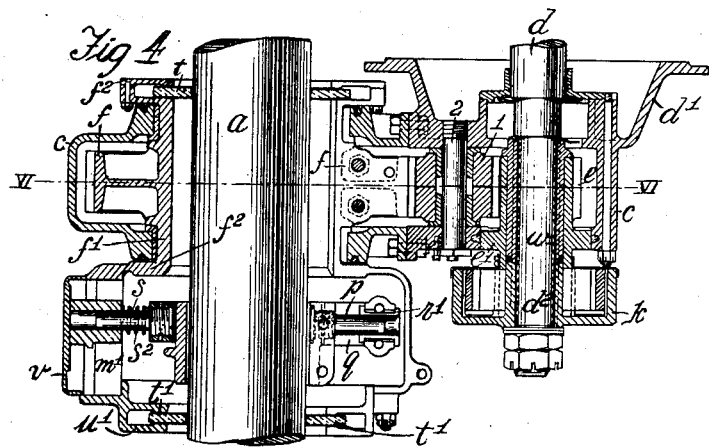
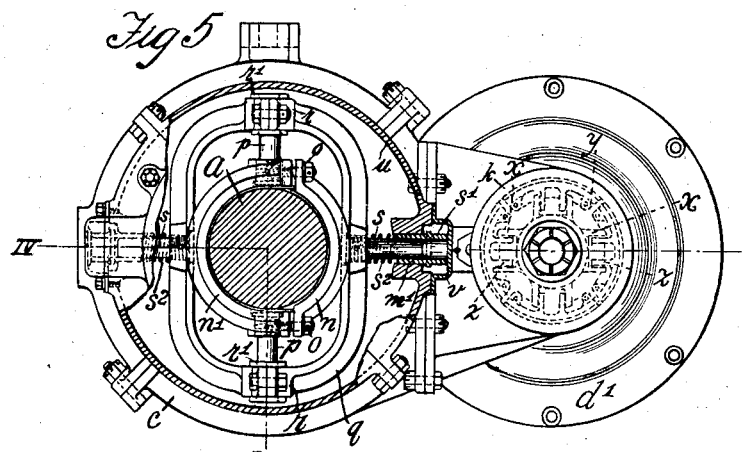
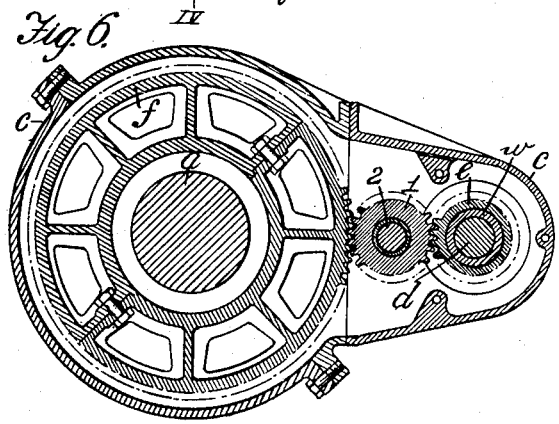

Aug. 12, 1930.  E. C. HATCHER  1,772,748
POWER TRANSMISSION GEARING FOR THE RUNNING AXLES OF VEHICLES
Filed Dec. 21, 1928  5 Sheets-Sheet 4
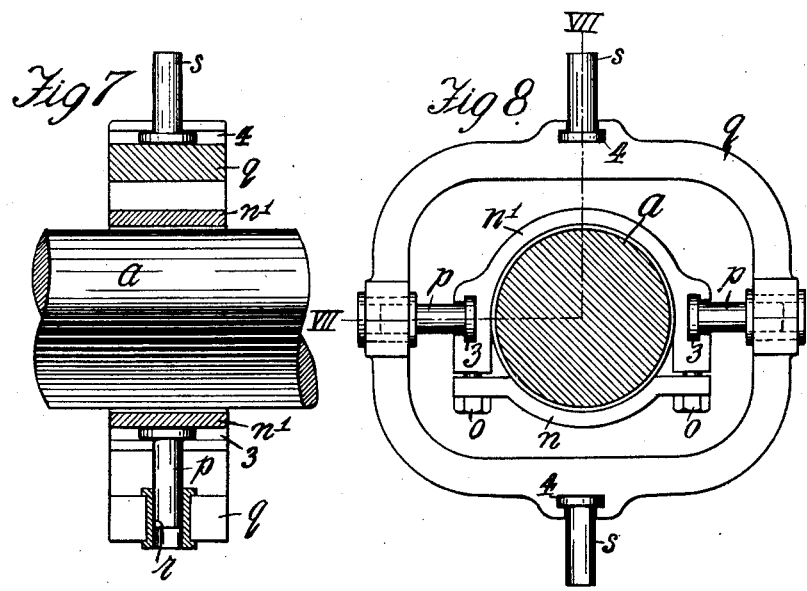
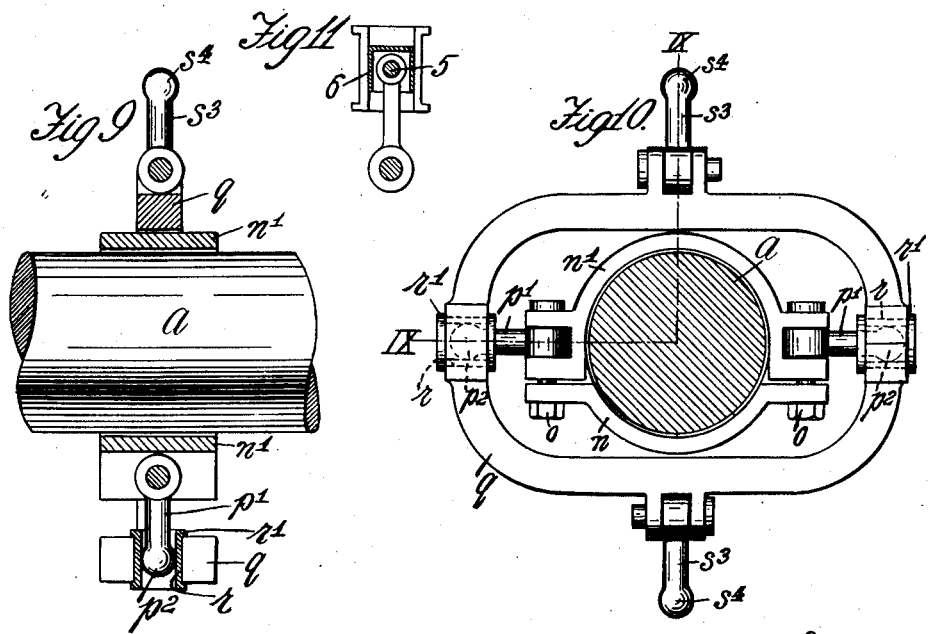
Inventor
Ernest C. Hatcher.
By Henry Orth Jr atty.

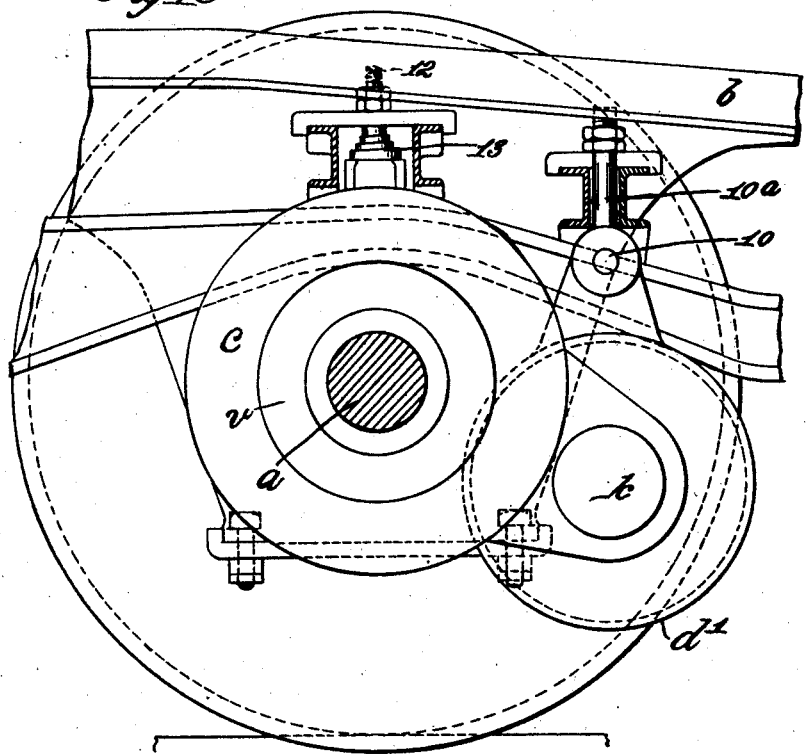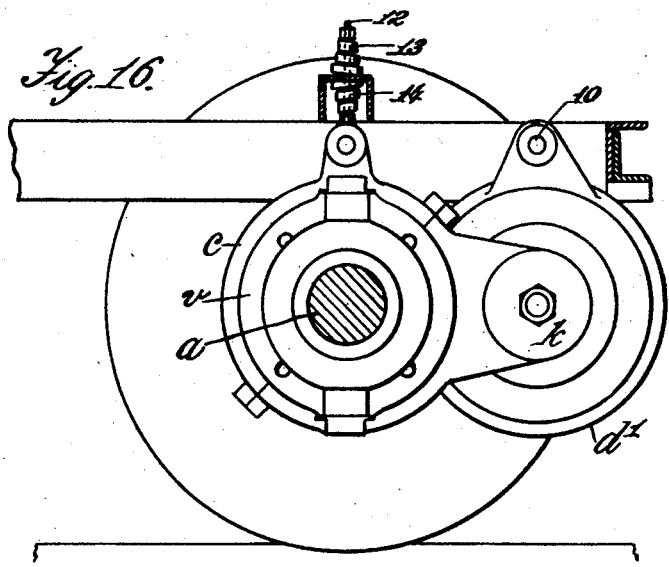

Patented Aug. 12, 1930

1,772,748

UNITED STATES PATENT OFFICE

ERNEST CHARLES HATCHER, OF NORTHWOOD, ENGLAND, ASSIGNOR TO J. STONE & COMPANY, LIMITED, OF DEPTFORD, ENGLAND

POWER-TRANSMISSION GEARING FOR THE RUNNING AXLES OF VEHICLES

Application filed December 21, 1928, Serial No. 327,646, and in Great Britain December 21, 1927.

This invention comprises improvements in and connected with power transmission gearing for the running axles of vehicles, and particularly the axles of railway vehicles. In some cases gearing is required to transmit the power of motors to the running axles. In other cases apparatus is driven from the axles, and dynamos, compressors, and ventilators are examples of useful service apparatus requiring to be driven from vehicle axles. The transmission usually employed for the driving of such apparatus is that comprising a belt running over a pulley on the axle, this being known as the slipping belt transmission. It has long been desired to have a positive mechanical gearing as an alternative to the slipping belt transmission and for this purpose toothed gearing has been proposed. However, various difficulties have been encountered. For example, railway vehicle axles generally are not machined over the greater portion of their length but are rough or unfinished so that the driving pinion cannot be mounted with accurate concentricity about the axis of revolution of the axle. Furthermore, it is generally necessary to employ divided pinions, the halves being put together around the axle and bolted together and in this case also the roughness or untrueness of the exterior of the axle may militate against accurate mounting of the pinion and against the divided parts coming together so truly as to preserve accuracy of the tooth pitch at the divisions. Finally, the jolting due to running and shunting and the shocks due to sudden braking and acceleration have been the cause of extremely heavy and injurious wear and tear of the pinion teeth.

The principal object of these improvements is to provide an efficient positive transmission gearing which is readily applicable to railway and other vehicle axles and in which the defects and difficulties above referred to are obviated, so that reliability and long life of the gearing may be depended upon.

According to this invention, the gearing is supported upon the framing, bogie-framing or undercarriage with the driving element of the gearing surrounding the axle but spaced therefrom, a flexible or universal coupling being provided between the axle and the said driving element. In this way, the said driving element is not affected by untrueness of the axle, it receives no hammering or shock due to rough roads or shunting, and it is never out of the most advantageous mesh with the driven element. The terms driving element and driven element have been used for the case in which apparatus is driven from an axle. When the drive is from a motor to the axle, these terms must be interchanged. A maximum effort clutch, or a unidirectional clutch may be employed in connection with the driven element of the gear, so that the transmission gearing and the apparatus driven thereby are not adversely affected or injured by violent braking of the running wheels. The gearing may be attached to the apparatus to be driven or to the motor and the whole may be supported by a two-point or a three-point suspension. Thus, the apparatus may be suspended from a horizontal pivot and the gear casing on one end of the apparatus may be supported by a spring-buffered suspension pivot device.

In order to enable the invention to be readily understood, reference is made to the accompanying drawings illustrating examples of practical construction embodying these improvements, in which drawings:—

Figure 1 is a vertical sectional view of a transmission gearing of the worm and wormwheel variety as applied for driving a dynamo from the axle of a railway vehicle, the plane of the section being perpendicular to the said axle.

Figure 2 is an elevation of a universal coupling device between the axle and the wormwheel which is the driving gear.

Figure 3 is a vertical sectional elevational of the mechanism, the plane of the section in this case passing through the longitudinal axis of the axle.

Figure 4 is a view similar to Figure 3 of a modified construction in which plain tooth gearing is employed. It is to be noted, however, that the view of the universal coupling in this figure is obtained by taking a section approximately on the line IV—IV of Figure 5.

Figure 5 is an end elevation of Figure 4 but with parts broken away to display the universal coupling.

Figure 6 is a transverse section on the line VI—VI of Figure 4.

Figure 7 and 8 illustrate a modification of the universal coupling, Figure 7 being a section on the line VII—VII of Figure 8, and Figure 8 being a sectional elevation looking in the longitudinal direction of that axle.

Figures 9 and 10 are views respectively similar to Figures 7 and 8, Figure 9 being a section on the line IX—IX of Figure 10 and these figures illustrate yet another modification of the universal coupling.

Figure 11 is a sectional elevation illustrating a further modification of one of the details of the universal coupling.

Figure 12 is a diagrammatic end elevation of a spring type of universal coupling.

Figure 13 is a diagrammatic side elevation and Figure 14 is an end view illustrating a three point suspension for a dynamo and transmission gearing such as shown in Figures 1 to 3.

Figures 15 and 16 are side elevations illustrating methods of suspending dynamos and transmission gearings of the kind illustrated in Figures 4 to 6.

Referring to Figures 1 to 3 of the drawings, $a$ is the axle of a railway vehicle, $b$ is a part of the under-framing or bogie framing thereof, $c$ is a casing suspended from such framing and enclosing the mechanism for transmitting power from the axle $a$ to a dynamo or other shaft $d$, the dynamo casing $d'$ being bolted to the casing $c$ as shown in Figure 1. The shaft $d$ is prolonged at $d^2$ so as to pass freely through the driven element $e$ of the gearing. In the example illustrated, the driven element $e$ is a quick pitch worm, or a helical gear, in mesh with a large hollow worm wheel $f$ journaled by means of hub extensions $f'$ in bearings $g$ in the walls of the casing $c$. The worm or helical gear $e$ through which the extension $d^2$ of the shaft $d$ passes is journaled by means of a hub extension $e'$ in a bearing $h$ in a casing part $c'$, and the shaft $d$ rotates in a bearing $h$ in the dynamo casing $d'$. The bearings $h$ are shown as ball bearings and, in addition, ball thrust bearings $j$ may be provided at the ends of the gear $e$. The outer end of the prolongation $d^2$ of the spindle $d$ may be fitted with a clutch drum $k$ and within the latter may be housed centrifugal clutch shoes, not shown, carried by the appropriate hub extension $e'$ of the worm or gear $e$. The casing $c$ may be charged with oil so that the gears $e\ f$ constantly run in lubricant. The casing $c$ is divided in a horizontal plane containing the axis of the axle $a$ and the divided parts are bolted together. The driving gear $f$ and its bearings $g$ also are in halves, the halves of the gear $f$ being bolted together around the axle, as shown, before the casing parts are bolted together to enclose such gear, as will be readily understood. The hub extensions $f'$ are formed with end flanges $f^2$ to take against end faces of cylindrical parts of the casing $c$ and with intermediate thrust collars $f^3$ to take against packing rings or thrust rings $l$ disposed so as to prevent escape of lubricant from the casing $c$.

The flanged hub extension $f'$ of the gear $f$ to the left hand of Figure 3 is formed at two diametrically opposite points with forks or slotted projections $m$ extending parallel with the axis of the axle $a$ as seen in Figure 3. A divided ring $n\ n'$ see also Figure 2, is clamped to the axle $a$ by securing the divided parts together around such axle by means of bolts $o$. The part $n'$ of the ring extends around a little more than 180° and the part $n$ extends around a little less than 180°, the ends of the part $n'$ being formed with radially projecting pins $p$. It is a useful feature to have the pins $p$ on the larger ring part $n'$ for the circular distance of 180° between the axes of these pins is consequently invariable. A floating ring or gimbal ring $q$ is formed at two diametrically opposite points with eyes $r$ for slidably engaging with the pins $p$ and is fitted at points 90° removed from the eyes $r$ with radially projecting pins $s$ which take into the forks or slotted projections $m$ on the hub extension $f'$ aforesaid. The internal diameter of the hollow gear $f$ and of its hub extensions $f'$ is much greater than the external diameter of the axle $a$ as will be apparent from Figure 3, so that contact between the gear $f$ and axle $a$ is not possible under any conditions. As will be seen from Figures 2 and 3, the pins $s$ may slide through holes in blocks $s'$ which are slidable along the forks $m$ in the direction of the axis of the axle $a$.

It will now be seen that the driving gear wheel $f$ is coupled to the axle $a$ by a kind of universal coupling which permits of relative movement in all directions between the axle $a$ and wheel $f$ without detriment to the transmission. Moreover, the engagement of the pins $s$ in the forks or slots $m$ permits of endwise movement of the axle $a$ relatively to the gearing. Therefore, the nicety of mesh between the gears $e$ and $f$ is not adversely affected in any way by irregular movements of the axle $a$ due to travel over rough or uneven tracks and an efficient and noiseless transmission is secured under all running conditions. If the running wheels should be violently braked or locked during running of the vehicle, this is without harm to the gears, for the centrifugal members in association with the driven gear $e$ will then fail to grip the drum $k$ so that the load is removed from the gears and the dynamo shaft $d$ is free to overrun the driven gear $e$. All the parts are readily accessible for examination or repair and the charge of lubricant in the casing $c$ may be such that the gears $e\ f$ will run for long periods without attention.

In the modification illustrated in Figures 4 to 6, parts similar or corresponding to those described with reference to Figures 1 to 3 are designated with the same reference letters as those employed in Figures 1 to 3. In this modification, the gearing is plain tooth gearing the driving wheel $f$ being a hollow pinion having hollow hub extensions $f'$ journalled in cylindrical parts of the walls of the casing $c$. As in the preceding construction, the internal diameter of the wheel $f$ is much greater than the external diameter of the axle $a$ so that an appropriate clearance is obtained. The flange $f^2$ on the end of the right hand extension $f'$ in Figure 4 is made hollow to receive a dust ring or washer $t$ encircling the axle $a$. The flange $f^2$ on the end of the left hand extension $f'$ is formed integrally with a cylindrical shell $u$ in which are formed guides $m'$ parallel with the axis of the axle $a$. These guides take the place of the guide form projections $m$ of Figure 3. A ring composed of two parts $n\ n'$ clamped together around the axle $a$ is similar to that described with reference to Figures 2 and 3. This ring $n\ n'$ is enclosed by the shell $u$ and the larger part $n'$ has its ends fitted with radial pins $p$ adapted for sliding through eyes $r$ of a gimbal ring $q$ carrying pins $s$ spaced 90° from the eyes $r$ as in the preceding construction. As will be seen from Figure 5, the ring $q$ may be non-circular and the eyes $r$ may be fitted with bushes $r'$ for the pins $p$ to slide in. The blocks $s'$ in which the pins $s$ are slidable are movable to and fro along the guides $m'$ in the shell $u$ and are pressed outwards by means of springs $s^2$ coiled around the pins $s$, the outward movement of the blocks $s'$ being arrested by covers $v$ fitted on the shell part $u$ over the guides $m'$. An outer end wall $u'$ fixed to the shell $u$ is hollow and is fitted with a dust ring $t'$. As seen in Figures 4 and 6, the pinion $e$ in this modification revolves freely on a bearing sleeve $w$ on the dynamo or other driven spindle $d$, and the dynamo casing $d'$ is formed integrally with a part of the gear casing $c$. The pinion $e$ is formed with one hub extension $e'$ at the left hand side in Figure 4, and the said hub extension is formed with four recesses or sockets $x$, shown in dotted lines in Figure 5. A friction clutch drum $k$, fixedly attached to the spindle $d$, surrounds the sockets $x$ and centrifugal brake shoes $y$ guided by radial stubs $z$ slidable in the sockets $x$ are adapted to fly outwards and grip the drum $k$ for clutching the pinion $e$ to the dynamo spindle $d$. The pinion $e$ in Figures 4 to 6 does not gear directly with the driving pinion $f$ but with an intermediate pinion 1 revolubly mounted on an axle pin 2 fixed in the walls of the gear casing $c$, as seen clearly in Figure 4. The operation of this modified construction is very similar to that described with reference to Figures 1 to 3, for the pins $p$ working in the gimbal ring $q$, and the pins $s$ of the gimbal ring $q$ working in the blocks $s'$ which are slidable in the guides $m'$ permit of movement of the axle $a$ in all directions relatively to the gear wheel $f$. Also, if the revolutions of the pinion $e$ should be suddenly retarded, or arrested, the shoes $y$ cease to grip the drum $k$ so that the dynamo shaft $d$ is free to overrun the pinion $e$.

Figures 7 and 8 illustrate a universal type of coupling in which the pins $p$ are slidably mounted in guides 3 in the ring part $n'$, these guides being parallel with the axis of the axle $a$. Also, the pins $s$ are slidable in guides 4 in the gimbal ring $q$, the guides 4 being parallel with the guides 3.

According to Figures 9 and 10, pins $p'$ are pivotally mounted on the ring part $n'$ of a universal coupling of the kind hereinbefore described and the said pins $p'$ have spherical heads $p^2$ engaging within bushes $r'$ in the eyes $r$ of the gimbal ring $q$. Also, pins $s^3$ are pivotally mounted on the ring $q$ and have spherical heads $s^4$ for engaging in bushes inserted in holes drilled in suitable projections or extensions of one of the gears $f$ of the mechanism hereinbefore described. According to a further modification illustrated in Figure 11, the pins $p'$ or $s^3$ of Figures 9 and 10 may be connected by gudgeon pins 5 with small pistons 6 slidable in bushes such as those marked $r'$ in Figures 9 and 10.

The constructions of universal coupling described with reference to Figures 7 to 11, all provide in themselves for relative motion between the axle $a$ and the gear coupled therewith in the direction of the axis of the axle as well as universally in a plane perpendicular to such axle.

Figure 12 illustrates a spring coupling which may be employed in place of the gimbal ring couplings hereinbefore described. Thus, the part $n'$ of the ring $n\ n'$ clamped around the axle $a$ may have radially extending arms 7 and these may be connected by springs 8 and 8ᵃ with suitable projections or anchoring points 9 on the hub extension $f'$ of a gear, such as one of the gears $f$ hereinbefore described. The springs 8 may be tensioned in one direction of running and the springs 8ᵃ may be tensioned in the reverse direction. As will be apparent, a coupling of this character permits of relative movement in all directions between the axle $a$ and the gear wheel coupled therewith.

Figures 13 and 14 illustrate more or less diagrammatically a method of supporting a dynamo and transmission gearing of the kind described with reference to Figures 1 to 3. The dynamo carcase has two lugs 10 for suspending it from the underframing by horizontal pivots. A casing 11 attached to the dynamo carcase and enclosing the transmission gearing is pivotally suspended by a pin 12 and is buffered against up and down movement by opposed springs 13 and 14. The pin 12 is triangulated with the lugs 10 so that an advantageous three point suspension is thereby achieved.

It will be understood that the springs 8 and 8ª in Figure 12 may be replaced by flexible connections of a different kind.

Figure 15 illustrates one mode of suspending apparatus of the kind described with reference to Figures 4 to 6 from a bogey or underframing of a railway vehicle. In this case, a horizontal pivot pin 10 supporting the dynamo casing $d'$ is carried by an eye bolt 10ª suspended from a frame member as shewn, the gear casing being suspended by a bolt 12 with buffer springs 13 as in Figure 13. In Figure 16, the horizontal pivot pin 10 is carried by one of the frame members and the dynamo is supported at a higher elevation than in Figure 15, the gear casing being suspended by a bolt 12 with buffer springs 13 as before. As will be readily understood, there may be single horizontal pivot lug or bearing for the pin 10 which, with the bolt 12, will give a two point suspension, or there may be two aligned lugs or bearings which, with the bolt 12, will give a three point suspension as described with reference to Figure 14.

One aspect of this invention is the provision of a centrifugal clutch in combination with a positive transmission gearing such as chain and sprocket or toothed gearing, the clutch being adapted for automatic opening when the axle speed falls below a pre-determined value. The advantage of this combination is that if the wheels of the axle are violently retarded, or locked, by sudden application of the brakes, the automatic opening of the clutch which then takes place permits the dynamo or other driven apparatus to overrun the axle. Thus, any danger to the gearing or to the driven apparatus is avoided by the safety opening of the clutch. Moreover, when the vehicle is at rest, the clutch being in an open position freely permits the dynamo to be motored or run idly without the necessity for making any mechanical disconnection or adjustment. It is thus rendered possible to carry out tests of dynamos very expeditiously and in a fool-proof manner.

I claim:

1. Mechanism for transmitting power from a running axle to a driven apparatus comprising in comination, a positive non-slip transmission gearing, universal coupling means between the axle and the gearing adapted to permit relative movement in any direction between said axle and gearing, and a centrifugal clutch device operative for de-clutching said driven apparatus during axle deceleration.

2. Mechanism for transmitting power from a running axle to a driven apparatus comprising in combination, meshed wheel gearing including an annular gear surrounding the axle with clearance, a universal coupling between said annular gear and said axle, and a centrifugal clutch disposed between said gearing and said apparatus and operative for de-clutching said apparatus when the axle speed falls below a pre-determined value.

3. Mechanism for transmitting power from a running axle to a driven apparatus comprising in combination, meshed wheel gearing including an annular gear surrounding the axle with clearance, a universal coupling of the gimbal ring variety between said annular gear and said axle, and a centrifugal clutch disposed between said gearing and said apparatus and operative for de-clutching said apparatus when the axle speed falls below a pre-determined value.

4. Mechanism for transmitting power from a running axle to a driven apparatus comprising in combination, an annular gear surrounding the axle with clearance, an unequally divided clamp ring fixed around said axle the larger portion of said ring carrying diametral pins, a gimbal ring engaged with said pins and having its gimbal pivots operatively engaged with said annular gear, and a centrifugal clutch device between said gear and the driven apparatus.

5. Mechanism for transmitting power from a running axle to a driven apparatus comprising in combination an annular gear surrounding the axle with clearance, a universal coupling of the gimbal ring type fixedly mounted on said axle and having axially free but rotative engagement with said annular gear, and transmission gearing including a self-opening clutch between said annular gear and the driven apparatus.

6. Mechanism for transmitting power from a running axle to a driven apparatus comprising in combination, an annular gear surrounding the axle with clearance, hub extensions on said gear, a universal coupling, a housing for said coupling formed in one of said hub extensions, and transmission gearing including a self-operating clutch between said annular gear and the driven apparatus.

7. Mechanism for transmitting power from a running axle to a pivotally suspended driven apparatus comprising in combination, an annular gear surrounding the axle with clearance, a universal coupling between the axle and said gear, transmission gearing including a self-opening clutch between said annular gear and the driven apparatus, a gear casing enclosing said annular gear and the gears meshed therewith said gear casing having a rigid connection with the driven apparatus, and a pivotal suspension including vertical buffering for said gear casing.

8. Mechanism for transmitting power from a running axle to a driven apparatus comprising in combination, meshed wheel gearing including an annular driving gear surrounding the axle with clearance and a gear loose on the spindle of the driven apparatus, a universal coupling between the axle and said annular gear, a radially socketed hub revoluble with the said loose gear, a drum fixedly mounted on the spindle of the apparatus, and centrifugal shoes guided in the sockets of said hub and adapted for flying out into gripping engagement with said drum when the loose gear revolves with appropriate speed.

ERNEST CHARLES HATCHER.